United States Patent [19]
Siegert et al.

[11] 3,943,037
[45] Mar. 9, 1976

[54] FUEL ELEMENT EXCHANGE SYSTEM

[75] Inventors: Heiner Siegert, Wiesbaden; Ulrich Ristow, Neu-Isenburg, both of Germany

[73] Assignee: Licentia Patent-Verwaltungs-GmbH, Frankfurt am Main, Germany

[22] Filed: Dec. 18, 1973

[21] Appl. No.: 425,772

[30] Foreign Application Priority Data
Dec. 18, 1972 Germany............................ 2261882

[52] U.S. Cl. ............................................... 176/30
[51] Int. Cl.² ........................................ G21C 19/20
[58] Field of Search .......................... 176/30, 31–37, 176/28, 94

[56] References Cited
UNITED STATES PATENTS

| | | | |
|---|---|---|---|
| 3,072,554 | 1/1963 | Madsen................................ | 176/31 |
| 3,138,535 | 6/1964 | Fortescue et al...................... | 176/30 |
| 3,143,479 | 8/1964 | Hargo et al........................... | 176/30 |
| 3,180,800 | 4/1965 | Fortescue et al...................... | 176/30 |

*Primary Examiner*—Samuel Feinberg
*Attorney, Agent, or Firm*—Spencer & Kaye

[57] ABSTRACT

In a nuclear reactor which is housed in a round building and which has a reactor pressure vessel in a reactor pool, a fuel element storage pool of arcuate outline, a gate-controlled channel interconnecting the two pools and an operating platform adjacent the pools, there is provided a fuel element exchange system which has a first fuel element exchange gantry supported on a column disposed in the center of the reactor building and on a rail which is held by the building wall and which is situated above the level of the operating platform, and a second fuel element exchange gantry supported under the first gantry in such a manner that the second gantry may freely pass under the first gantry. There is further provided a fuel element box-stripping machine at the storage pool immediately across from the channel within the operational range of both the first and the second gantries.

7 Claims, 3 Drawing Figures

FUEL ELEMENT EXCHANGE SYSTEM

BACKGROUND OF THE INVENTION

In heterogeneous nuclear reactors, the used fuel elements have to be replaced or rearranged in the reactor core after predetermined time intervals. In water reactors, such a fuel element exchange may be effected in two ways: In case of a so-called "dry" exchange, the fuel element is drawn under water into a closable steel container and the latter is, together with the enclosed cooling water and the fuel element, transported into a fuel element storage pool. In case of a so-called "wet" fuel element exchange, the reactor pool and the adjacent fuel element storage pool are interconnected by means of a channel in which there is disposed a watertight gate. As a preparatory step to the wet fuel element exchange, the water level in the reactor pool is raised to the water level in the fuel element storage pool and the gate is opened. Subsequently, the fuel elements may be grasped with specially designed tools mounted on a travelling fuel element exchange gantry and moved through the connecting channel between the reactor and the assigned storage space in the fuel element storage pool. In case the fuel elements are disposed in sheaths (boxes), a conventional box-stripping machine has to be provided in addition.

The invention relates to a system for performing a wet fuel element exchange process. Heretofore, for effecting this type of exchange, the rails on which the gantry travels have been disposed at the same height as the edge of the fuel element storage pool and the level of the operating platform. Further, the box-stripping machines and tool storing devices have been disposed in the rear part of the fuel element storage pool which requires that these apparatuses project beyond the pool edge.

It is a disadvantage of the above-outlined known systems for effecting a wet fuel element exchange that they involve long travelling paths and thus require long periods of reactor shutdowns.

SUMMARY OF THE INVENTION

It is an object of the invention to provide an improved system for effecting a wet fuel element exchange, by means of which the duration of the fuel element exchange process can be shortened.

This and other objects to become apparent as the specification progresses, are achieved by the invention according to which, briefly stated, there are provided a first fuel element exchange gantry supported on a column disposed in the center of the reactor building and on a rail which is held by the building wall and which is situated above the level of the operating platform, and a second fuel element exchange gantry supported under the first gantry in such a manner that the second gantry may freely pass under the first gantry. There is further provided a fuel element box-stripping machine at the storage pool immediately across from the channel in the operational range of both the first and the second gantries.

The advantage of the invention resides in the shortening of travelling paths and thus time saving in the performance of the fuel element exchange operation is accomplished. The shortening of the paths result principally from the arrangement of the box-stripping machine or machines at the fuel element storage pool directly across from the connecting channel.

The disposition of the box-stripping machine and the tool storing devices, if any, directly across from the connecting channel and the thus accomplished shortening of the travelling paths during the fuel element exchange are made possible by arranging the main fuel element exchange gantry above the level of the operating platform. Further, in the system according to the invention, there is effected a division of the fuel element handling between two exchange gantries, resulting in a further time saving.

DESCRIPTION OF THE PREFERRED EMBODIMENTS

Figure 1:
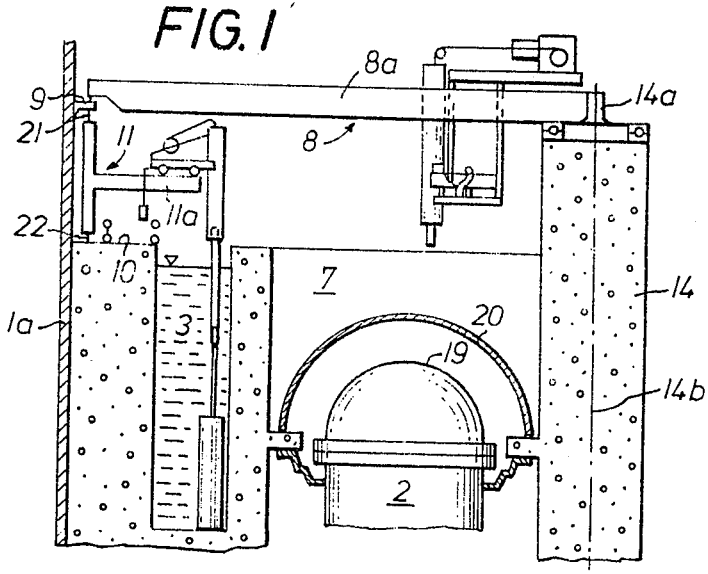
FIG. 1 is a schematic elevational view of a preferred embodiment of the invention.
Figure 2:
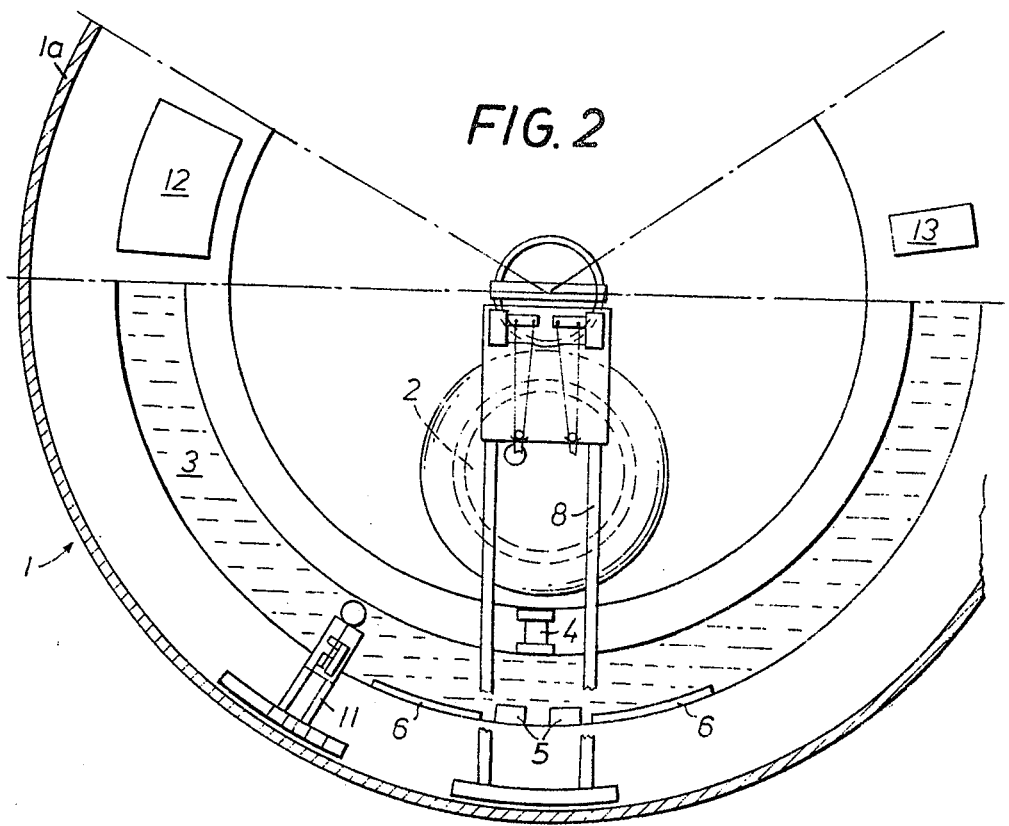
FIG. 2 is a schematic plan view of the same embodiment.

Turning now to FIGS. 1 and 2, in a round reactor building 1 having a generally circularly extending vertical wall 1a, there is eccentrically situated a reactor pressure vessel 2, the upper terminal portion of which projects upwardly into a reactor pool 7. The latter is surrounded in a semicircle by a fuel element storage pool 3 which is of arcuate outline and which is filled with water to a predetermined level. Adjacent the two ends of the semicircular storage pool and in alignment therewith, there are provided openings 12 and 13 which are needed during the transport and insertion of new fuel elements. A connection between the reactor pool 7 and the fuel element storage pool 3 is provided by a channel 4 controlled by a watertight gate. In the fuel element storage pool 3, directly across from the channel 4, there are situated box-stripping machines 5 and, according to a further development of the invention, laterally of the box-stripping machines 5, there are provided tool storing devices 6 for the handling rods and the like.

If now a fuel element exchange operation is to be performed, first the pressure vessel 2 is opened by removing the pressure vessel lid 19 and the cover 20. The reactor pool 7, which is situated above the reactor pressure vessel 2, may then be flooded and the gate of the channel 4 may be opened.

After these preparatory steps, a main fuel element exchange gantry 8 is put to work. The gantry 8 has a bridge 8a, one end of which is supported for rotation at 14a by a vertical column 14 disposed substantially in the center of the reactor building 1. The bridge 8a is thus horizontally rotatable about a vertical axis 14b which passes through one end of the bridge 8a and which extends in the center of the building 1. The other end of the gantry bridge 8a is supported on a rail 9 which is situated above the level of an operating platform 10 (approximately at a vertical distance of 5 meters therefrom), and extends in an arc along the wall 1a of the reactor building 1.

By means of a non-illustrated grasping device arranged on the hoist trolley of the main fuel element exchange gantry 8, a fuel element situated in the reactor pressure vessel 2 may be grasped, withdrawn from the pressure vessel 2 and carried through the channel 4 to one of the box-stripping machines 5.

The arrangement of the rail 9 of the main fuel element exchange gantry 8 above the level of the operating platform 10 makes possible the provision of a second, more simple, fuel element exchange gantry 11 also having a fuel element grasping device mounted thereon. The gantry 11 operates simultaneously with the main fuel element exchange gantry 8 and transports the fuel elements from the storage pool 3 to the box-stripping machines 5 and conversely. Further, by means of the fuel element exchange gantry 11, the fuel elements and the fuel element storage racks 18 may be rearranged in the storage pool 3. The fuel element exchange gantry 11 has a cantilever bridge 11a and is supported and travels on two vertically spaced, parallel extending rails 21 and 22, both disposed beneath the rail 9 for the gantry 8. The support structure for the rail 9 may simultaneously serve — as it is seen in FIG. 1 — as the support for the upper rail 21 of the gantry 11. As it is also observable in FIG. 1, the gantry 11 may pass freely under the gantry 8.

Figure 3:
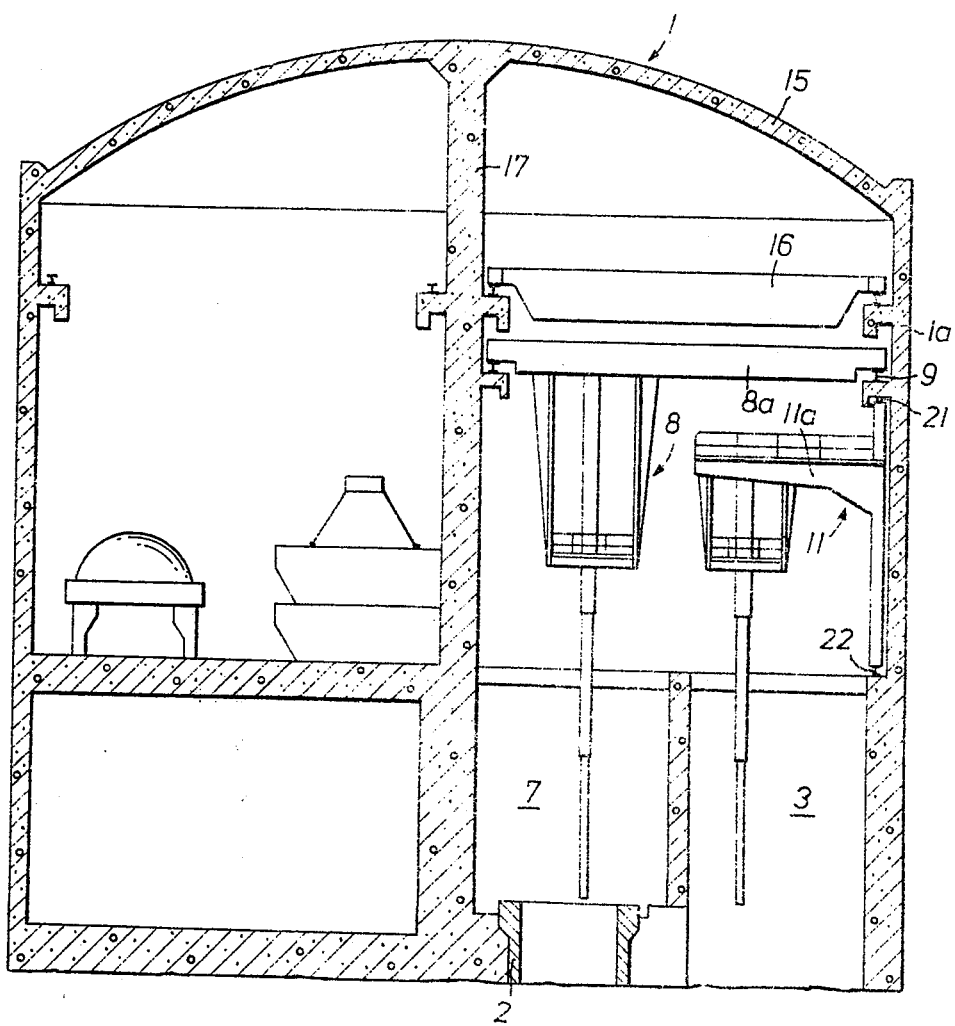
FIG. 3 is a sectional elevational view of another preferred embodiment of the invention.

According to another embodiment of the invention, as illustrated in FIG. 3, there is provided a central column 17 which is a modification of the column 14 of the FIG. 1 embodiment. The column 17, in addition to supporting the gantry 8, also supports the inner rail of a building gantry 16 situated above the gantry 8 and further serves as a support member for a building roof 15.

The box-stripping machines 5 are not illustrated in detail, because the usual box-stripping machines may be used. As already mentioned the fuel elements (fuel-rod assembly) are disposed in sheath (boxes). The box-stripping machines 5 serve to pull the fuel-rod assembly out of its box. After being pulled out of its box the fuel-rod assembly mas be transported directly to the fuel element storage pool 3 by the gantry 11. On the way back to the box-stripping machines the gantry 11 transports a new fuel element (fuel-rod assembly) which then is inserted in the box by the box stripping machine 5.

Also the tool storing devices 6 are not illustrated in detail because the shape of the devices is determined by the tools. These tools may be for example; handling rods, screw-gripper, underwater-screwdrivers, television equipment and so on.

It will be understood that the above description of the present invention is susceptible to various modifications, changes and adaptations, and the same are intended to be comprehended within the meaning and range of equivalents of the appended claims.

We claim:

1. A system for the wet exchange of fuel elements in a nuclear reactor housed in a round reactor building having a generally circularly extending vertical wall surrounding the nuclear reactor; the nuclear reactor being of the type having a safety pressure vessel containing nuclear fuel elements in use, a reactor pool situated above the pressure vessel, a fuel element storage pool of arcuate outline, a gate-controlled channel connecting the reactor pool with the storage pool, and an operating platform situated adjacent the pools; comprising in combination:
    a. a support column disposed within and substantially centrally with respect to said reactor building;
    b. a first fuel element exchange gantry including a bridge disposed above the level of said operating platform and having two opposite ends, one of said ends being supported on said column;
    c. an arcuately extending rail held in said vertical wall above the level of said operating platform and supporting the other of said ends of said bridge;
    d. a second fuel element exchange gantry having a cantilever bridge;
    e. means for supporting said second gantry below said first gantry and providing for said second gantry a free, unobstructed passage under said first gantry; and
    f. at least one fuel element box-stripping machine disposed at said storage pool immediately across from said channel within the operational range of said first and second gantries.

2. A system as defined in claim 1, wherein said one end of the bridge of said first gantry is supported for rotation about a vertical axis extending centrally with respect to the reactor building.

3. A system as defined in claim 1, including at least one tool storing device disposed immediately laterally adjacent said box-stripping machine.

4. A system as defined in claim 1, wherein the reactor building has a roof, said column is connected to the roof for serving as a roof support.

5. A system as defined in claim 1, wherein said column includes means for supporting a building gantry situated above said first gantry.

6. A system as defined in claim 1, wherein said means for supporting said second gantry includes two additional, vertically spaced parallel rails supported in said wall below the rail associated with said first gantry.

7. A system as defined in claim 6, wherein the rail associated with said first gantry defines a travelling path for said first gantry for carrying fuel elements between the pressure vessel and the box-stripping machine through the reactor pool, the channel and the storage pool; the additional rails associated with said second gantry define a travelling path for said second gantry for carrying fuel elements through the storage pool between the box-stripping machine and their location of storage in the storage pool.

* * * * *